(12) United States Patent
Braun et al.

(10) Patent No.: US 8,545,724 B2
(45) Date of Patent: Oct. 1, 2013

(54) ODORANT FOR HYDROGEN BASED ON ACRYLATE AND ACETOPHENONE

(75) Inventors: Norbert Braun, Queens (SG); Jörg Eilers, Holzminden (DE); Dirk Müller, Dassel (DE)

(73) Assignee: Symrise AG, Holzminden (DE)

( * ) Notice: Subject to any disclaimer, the term of this patent is extended or adjusted under 35 U.S.C. 154(b) by 1375 days.

(21) Appl. No.: 11/721,077

(22) PCT Filed: Dec. 19, 2005

(86) PCT No.: PCT/EP2005/056908
§ 371 (c)(1),
(2), (4) Date: Jun. 7, 2007

(87) PCT Pub. No.: WO2006/067112
PCT Pub. Date: Jun. 29, 2006

(65) Prior Publication Data
US 2009/0224206 A1    Sep. 10, 2009

Related U.S. Application Data

(60) Provisional application No. 60/638,456, filed on Dec. 22, 2004.

(51) Int. Cl.
*C09K 3/00*    (2006.01)
*A61K 8/18*    (2006.01)

(52) U.S. Cl.
USPC ............................................. 252/372; 512/21

(58) Field of Classification Search
USPC ........................................................ 252/372
See application file for complete search history.

(56) References Cited

U.S. PATENT DOCUMENTS

| | | | | |
|---|---|---|---|---|
| 6,165,517 A | * | 12/2000 | Farbood et al. | 426/60 |
| 2002/0055453 A1 | * | 5/2002 | Eh et al. | 512/8 |
| 2004/0031314 A1 | * | 2/2004 | Flynn et al. | 73/40.7 |
| 2005/0020479 A1 | * | 1/2005 | Kato | 512/20 |

FOREIGN PATENT DOCUMENTS

| | | | |
|---|---|---|---|
| DE | 102 35 750 | | 2/2004 |
| DE | 102 35 756 | | 2/2004 |
| DE | 10235752 | * | 2/2004 |
| DE | 10235752 A1 | * | 2/2004 |
| EP | 1 464 693 | | 10/2004 |
| WO | 2004/024852 | | 3/2004 |

* cited by examiner

*Primary Examiner* — Bijay Saha
(74) *Attorney, Agent, or Firm* — Roylance, Abrams, Berdo & Goodman, L.L.P.

(57) ABSTRACT

The present invention concerns a nitrogen-free and sulfur-free odorant for hydrogen gas containing at least one acrylic acid $C_1$-$C_6$-alkyl ester and acetophenone, its use for the odorization of hydrogen gas, a process for the odorization of hydrogen gas and hydrogen gas containing an odorant according to the invention.

10 Claims, No Drawings

ODORANT FOR HYDROGEN BASED ON ACRYLATE AND ACETOPHENONE

FIELD OF THE INVENTION

The present invention concerns a nitrogen-free and sulfur-free odorant for hydrogen gas ($H_2$ in the liquid or gaseous state of aggregation), containing at least one acrylic acid $C_1$-$C_6$-alkyl ester and acetophenone (CAS number: 98-86-2), its use as an odorant for hydrogen gas, a process for the odorisation of hydrogen gas and hydrogen gas containing such an odorant.

If leaks in systems containing (fuel) gas are not detected in good time, explosive (fuel) gas/air mixtures with a high risk potential can develop.

For safety reasons, (fuel) gases which do not have a sufficiently strong characteristic odour are therefore commonly odorised by the addition of strong-smelling substances.

BACKGROUND OF THE INVENTION

Gas odorisation is accordingly understood to be the addition of strong-smelling substances (odorants) acting as warning or alarm substances to gases which do not themselves have a significant characteristic odour, i.e. to otherwise substantially or entirely odourless (fuel) gases.

These odorants are perceptible even when highly diluted and because of their exceptionally unpleasant odour they provoke an alarm association in people in the desired way. The odorant must not only have an unpleasant and unmistakable odour but above all must clearly represent a warning odour. The smell of the odorant and the odorised (fuel) gas must therefore not be familiar to people from everyday life, e.g. from the kitchen or home.

Various odorants for fuel gases in general and/or hydrogen in particular have already been described.

In JP-A 55-104393 it is stated that odorants containing an alkyne and at least two compounds chosen from a group comprising methyl acrylate, ethyl acrylate, methyl methacrylate, allyl methacrylate, ethyl propionate, methyl n-butyrate, methyl isobutyrate and phenyl acrylate, and optionally tert-butyl mercaptan, are suitable for the odorisation of fuel gases.

Odorants for fuel gases consisting of ethyl acrylate (70 wt. %) and tert-butyl mercaptan (30 wt. %) are known from JP-B 51-021402.

Mixtures of $C_4$-$C_7$-aldehydes and sulfur compounds are described as odorants in JP-A 50-126004. Odorisation of 1 kg of propane was performed with 50 mg of a mixture of 60 wt. % of valeraldehyde and 40 wt. % of n-butyl mercaptan. Valeraldehyde intensifies the odour of n-butyl mercaptan here. 2-Methyl valeraldehyde was used in a similar way.

In DE-A 19837066 the problem of the sulfur-free gas odorisation of natural gas was solved with mixtures containing at least one acrylic acid $C_1$-$C_{12}$-alkyl ester and an alkyl-substituted 1,4-pyrazine.

US 2004/0197919 concerns the odorisation of fuels, such as hydrogen for example, for fuel cells for the purposes of leak detection. A large number of organic substances from the compound classes comprising aldehydes, ketones, esters, furanones and pyrazines are proposed. Explicitly cited esters are methyl acetate, butyl acetate, ethyl butyrate, methyl butyrate and ethyl-2-methyl butyrate.

DE 103 00 556 (corresponding to US 2003/0126796) proposes fatty acids such as acetic acid or butanoic acid as odorants for fuel gas for a fuel cell. In US 2004/0072050 a fuel cell system for odorised hydrogen is described wherein butyric acid is cited as the odorant.

JP 2002-060766 describes odorants for fuel gases for a fuel cell wherein hydrogen is not cited as the fuel gas. Odorants based on alkyl esters of $C_4$-$C_6$-carboxylic acids, which preferably contain one or two further substances from the class of mercaptans, sulfides and pyrazides to intensity the olfactory effect, are proposed there.

JP 2003-155488 lists a very large number of odiferous compounds, some of them containing nitrogen and/or sulfur, as odorants for hydrogen, which were examined with regard to the membrane and catalyst compatibility. Methyl acrylate, ethyl acrylate, acetophenone, propanal and butanal are cited among others. Mixtures are not described. A large number of typical odiferous substances are listed, such as e.g. vanillin, benzaldehyde, limonene or 1,8-cineol (eucalyptol), which have no alarm effect, so no reference to particularly suitable or improved odorants in terms of olfactory properties can be taken from this document.

US 2004/0031314 concerns a selection procedure for odorants for the odorisation of hydrogen. Ethyl acrylate is cited, but not classed as an advantageous candidate. Amines such as methylamine, thiols such as ethyl mercaptan or selenium compounds such as ethyl selenol are regarded as being preferred there.

It is known from U.S. Pat. No. 2,430,050 and DE-A 198 37 066 that antioxidants, particularly phenol derivatives, are suitable for stabilising gas odorants containing alkyl acrylate.

SUMMARY OF THE INVENTION (Alternative) nitrogen-free and sulfur-free odorants for the odorisation of hydrogen were sought, which are preferably superior in their properties to the previously known odorants, in particular with regard to their warning odour, wherein in addition to the quality of the warning odour, the storage stability of the odorant is also important, since the quality of the warning odour should also be ensured over an extended (storage) period. In addition, good noble metal catalyst compatibility is advantageous.

DETAILED DESCRIPTION OF THE INVENTION

The present invention primarily provides a nitrogen-free and sulfur-free odorant for hydrogen gas, consisting of or containing
A) one or more acrylic acid $C_1$-$C_6$-alkyl esters;
B) acetophenone;
C) optionally one or more compounds from the group of $C_3$-$C_4$-aldehydes,
D) optionally one or more antioxidants.

The invention also concerns the use of the odorant according to the invention for the odorisation of hydrogen gas.

The odorants according to the invention are free from nitrogen and sulfur. Thus in particular they include no compounds or components with sulfur (such as e.g. mercaptans, sulfides or disulfides) or nitrogen (such as e.g. amines, amides, pyridines or pyrazines). In a preferred embodiment the odorants according to the invention are free from nitrogen, selenium and sulfur. These preferred odorants thus then include no compounds or components with sulfur, nitrogen or selenium (such as e.g. selenols or selenides).

The invention additionally concerns a corresponding process for the odorisation of hydrogen gas having a hydrogen content of at least 98 wt. %. In this process an odorant according to the invention is added to the hydrogen gas. Regarding preferred embodiments, see the details of the preferred odorants and uses according to the invention, which apply accordingly.

The present invention also provides an odorised hydrogen gas comprising (i) a hydrogen gas having a hydrogen content ($H_2$ content) of at least 98 wt. % and (ii) an odorant according to the invention.

By preference, the hydrogen gas to be odorised has a hydrogen content of at least 99 wt. %, preferably at least 99.9 wt. % and particularly preferably at least 99.99 wt. %. In a preferred embodiment the hydrogen gas to be odorised (component (i) of an odorised hydrogen gas according to the invention) has a hydrogen content of at least 99.99 wt. % and contains at most 2 ppm of oxygen ($O_2$), at most 3 ppm of nitrogen ($N_2$), at most 5 ppm of water and at most 1 ppm of hydrocarbons.

The acrylic acid $C_1$-$C_6$-alkyl esters according to component A) of an odorant according to the invention are advantageously chosen from the group consisting of acrylic acid methyl ester, acrylic acid ethyl ester, acrylic acid n-propyl ester, acrylic acid isopropyl ester, acrylic acid n-butyl ester, acrylic acid isobutyl ester, acrylic acid tert-butyl ester, acrylic acid n-pentyl ester, acrylic acid isopentyl ester and acrylic acid n-hexyl ester.

Acrylic acid $C_1$-$C_4$-alkyl esters are preferred, in particular acrylic acid methyl ester, acrylic acid ethyl ester, acrylic acid n-propyl ester, acrylic acid isopropyl ester, acrylic acid n-butyl ester and acrylic acid isobutyl ester. Acrylic acid $C_1$-$C_4$-alkyl esters which are most particularly preferred are acrylic acid methyl ester, acrylic acid ethyl ester and acrylic acid n-butyl ester. Component A) preferably consists of an odorant according to the invention comprising acrylic acid methyl ester and acrylic acid ethyl ester.

If the odorants according to the invention contain two acrylic acid $C_1$-$C_4$-alkyl esters from the group comprising acrylic acid methyl ester, acrylic acid ethyl ester and acrylic acid n-butyl ester, the preferred ratio by weight of the lower molecular weight acrylic acid alkyl ester to the higher molecular weight acrylic acid alkyl ester is in the range from 9:1 to 1:9, preferably in the range from 7:3 to 3:7, in particular in the range from 3:1 to 1:4. The ratio by weight of the lower molecular weight acrylic acid alkyl ester to the higher molecular weight acrylic acid alkyl ester is most particularly preferably in the range from 1:1 to 1:3.

By preference, component A) is contained in an odorant according to the invention in a quantity of 80 to 97 wt. %, preferably 85 to 97 wt. %, preferably 90 to 97 wt. %, relative to the total mass of the odorant, provided that the odorant according to the invention contains no components C) and D).

If an odorant according to the invention contains a component C), component A) is contained in the odorant in a quantity of by preference 80 to 97 wt. %, preferably 85 to 95 wt. %, preferably 85 to 92 wt. %, relative to the total mass of the odorant.

By preference, component B) (acetophenone) is contained in the odorants according to the invention in a quantity of 1 to 15 wt. %, preferably 2 to 12 wt. % and particularly preferably 3 to 8 wt. %, relative to the total mass of the odorant.

The $C_3$-$C_4$ aldehydes of component C) optionally contained in an odorant according to the invention are preferably propionaldehyde or n-butyraldehyde. Component C) preferably consists of propionaldehyde.

If it is present at all, component C) is preferably included in an odorant according to the invention in a quantity of 1-10 wt. %, preferably 3-8 wt. %, relative to the total mass of the odorant.

If the odorant according to the invention contains a component C), the ratio by weight of component B) to component C) is preferred to be in the range from 3:1 to 1:3, preferably in the range from 2:1 to 1:2 and particularly preferably in the range from 1.2:1 to 1:1.2.

The odorant according to the invention can contain one or more antioxidants as component D), to increase stability for example. The addition of one or more antioxidants is not necessary in the absence of a component C). If a component C) is a constituent of an odorant according to the invention, the presence of component D) is of considerable advantage. In particular, in the presence of component D), a high storage stability (more than six months at 20° C. or 40° C.) is achieved in an odorant according to the invention, along with a corresponding storage stability of an odorised hydrogen gas according to the invention.

The following compounds (antioxidants) can be cited by way of example for use in component D): vitamin C and derivatives (e.g. ascorbyl palmitate, ascorbyl acetate), tocopherols and derivatives (e.g. vitamin E, vitamin E acetate), vitamin A and derivatives (vitamin A palmitate), phenolic benzylamines, formic acid, acetic acid, benzoic acid, sorbic acid, hexamethylene tetramine, tert-butyl hydroxytoluene (BHT), tert-butyl hydroxyanisole, α-hydroxy acids (e.g. citric acid, lactic acid, malic acid), hydroquinone monomethyl ether (4-methoxyphenol), 2-ethyl phenol, 4-ethyl phenol. For the odorants according to the invention and the odorised hydrogen gas according to the invention, tert-butyl hydroxytoluene (BHT) and hydroquinone monomethyl ether have proved to be particularly effective and to have a good stabilising action.

By preference, the total amount of antioxidants (component D) in the odorant, if present at all, is in the range from 0.01 to 0.2 wt. %, preferably in the range from 0.02 to 0.15 wt. %, particularly preferably in the range from 0.05 to 0.1 wt. %.

In a preferred embodiment the present invention concerns a nitrogen-free and sulfur-free odorant (and its use for the odorisation of hydrogen gas having a hydrogen content of at least 98 wt. %) consisting of or containing
A) two different acrylic acid $C_1$-$C_4$-alkyl esters;
B) acetophenone;
C) propionaldehyde and/or n-butyraldehyde;
D) optionally one or more antioxidants.

In a particularly preferred embodiment, the present invention concerns a nitrogen-free and sulfur-free odorant (and its use for the odorisation of hydrogen gas having a hydrogen content of at least 98 wt. %) containing or consisting of
A) acrylic acid methyl ester and acrylic acid ethyl ester;
B) acetophenone;
preferably in the aforementioned preferred proportions by weight and/or ratios by weight.

By preference, the sum of components A) and B) according to this particularly preferred embodiment is in the range from 85 to 100 wt. %, preferably in the range from 90 to 100 wt. % and particularly preferably in the range from 95 to 100 wt. %, relative to the total weight of the odorant.

The most preferred odorant according to the particularly preferred embodiment consists of
A) 60 wt. % ethyl acrylate and 35 wt. % methyl acrylate;
B) 5 wt. % acetophenone.

In a further particularly preferred embodiment, the present invention concerns a nitrogen-free and sulfur-free odorant (and its use for the odorisation of hydrogen gas having a hydrogen content of at least 98 wt. %) consisting of or containing
A) acrylic acid methyl ester and acrylic acid ethyl ester;
B) acetophenone;
C) propionaldehyde and/or n-butyraldehyde;

D) one or more antioxidants, preferably tert-butyl hydroxytoluene and/or hydroquinone monomethyl ether,
preferably in the aforementioned preferred proportions by weight and/or ratios by weight.

By preference, the sum of components A) to D) according to this further particularly preferred embodiment is in the range from 90 to 100 wt. %, preferably in the range from 95 to 100 wt. % and particularly preferably in the range from 98 to 100 wt. %, relative to the total weight of the odorant.

The most preferred odorant according to the further particularly preferred embodiment consists of
A) 59.9 wt. % ethyl acrylate and 30 wt. % methyl acrylate;
B) 5 wt. % acetophenone;
C) 5 wt. % propionaldehyde, and
D) 0.1 wt. % tert-butyl hydroxytoluene and/or hydroquinone monomethyl ether.

With the presence of component C) in the odorants according to the invention, a still better warning odour is achieved in comparison to mixtures containing only components A) and B), see also the examples further on in this respect.

By preference, the amount of odorant relative to the hydrogen gas to be odorised is in the range from 5 to 100 milligrams of odorant per kilogram of hydrogen gas (5 to 100 mg/kg, corresponding to 5 to 100 ppm), preferably 10 to 80 mg/kg, particularly preferably 15 to 70 mg/kg and most particularly preferably 20 to 60 mg/kg.

The odour detection threshold indicates the concentration above which the odour of a substance in or from a medium is detected by people. The odour detection threshold for an odorant according to the invention consisting of 59.9 wt. % ethyl acrylate, 30 wt. % methyl acrylate, 5 wt. % acetophenone, 5 wt. % propionaldehyde and 0.1 wt. % hydroquinone monomethyl ether (4-methoxyphenol) (referred to below as mixture A) was determined by a group of testers (twelve trained testers) across a series of dilutions (diluting agent: synthetic air or gaseous nitrogen). The value was 62.5 pg/l (pictograms per litre).

The warning odour of a hydrogen gas (hydrogen content>99 wt. %) odorised according to the invention with 50 mg/kg of mixture A was perceived by a group of testers (30 trained testers, 15 of them female and 15 male) in a dilution of hydrogen in air in the range from 1:200 to 1:2000 to be unambiguous in terms of odour character and strong in terms of odour intensity. On a scale of 1 (none at all) to 5 (very strong), the following odour rating was obtained:
aggressive: 3.3
unpleasant: 3.8
alarming: 3.9
chemical: 3.6
floral, fruity: 1.8
fresh: 1.7

Furthermore, the storage stability of the hydrogen gas odorised with mixture A according to the invention was tested at a dosage of 50 mg of mixture A per kg of hydrogen. The hydrogen gas odorised according to the invention was stored in a steel tube at a hydrogen pressure of 800 bar at 25° C. or 80° C. for a period of 3 months. In both cases, after cooling to 20° C. and pressure reduction to 1 bar, assessment of the odour by 12 trained testers revealed no significant change or reduction in terms of odour character or odour intensity.

Odorants should as far as possible display no catalytic poisoning action. Hydrogen containing an odorant acting as a catalyst poison would be more likely to be unsuitable for use in hydrogenation reactions or in fuel cells.

For that reason odorants according to the invention were also tested in regard to their catalyst compatibility. The test system described below was used.

A mixture (referred to below as the test mixture) of alpha- and beta-pinene was dissolved in ethyl acetate as solvent. Palladium or platinum on activated carbon (metal content: 5 wt. % Pd or Pt, relative to the anhydrous catalyst) were added as hydrogenation catalysts and the test mixture was hydrogenated for 6 hours at a hydrogen pressure of 200 bar and at 25° C. This produces dihydropinene in quantitative yields.

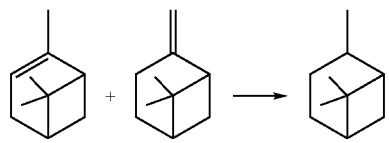

If a substance to be tested (which can also be a mixture of substances) is added to the test mixture before hydrogenation, conclusions can be drawn from the progress of the hydrogenation and the composition of the reaction mixture about the effectiveness of the substance to be tested as a catalyst poison.

Specifically, if a substance acting as a catalyst poison (for example sulfur compounds such as mercaptans, aromatic nitrogen compounds such as pyridine, etc.) is added to the test mixture before hydrogenation, a noticeably incomplete hydrogenation occurs, wherein the exocyclic double bond of the beta-pinene is hydrogenated still faster, however, than the endocyclic double bond of the alpha-pinene. In extreme cases the hydrogenation reaction stops altogether.

If on the other hand substances tolerated by the catalysts are added, the reaction proceeds in exactly the same way as with the test mixture alone (complete hydrogenation to form dihydropinene).

The advantage of this method lies in the fact that, regardless of the substance to be tested, evaluation of the quantities (proportions) of dihydropinene and alpha- and beta-pinene (GC, GC-MS) on completion of hydrogenation allows conclusions to be drawn about any action by the substance as a catalyst poison, without having to analyse the reaction products deriving from the substance to be tested.

With the addition of odorants according to the invention such as e.g. mixture A according to the invention, it was found in the described test system that the catalysts tolerate these odorants and the odorants do not act as a catalyst poison. A complete hydrogenation of the test mixture to form dihydropinene took place. The same result was obtained with the addition of acetophenone alone.

The examples below illustrate the invention:

Unless otherwise specified, all figures stated relate to the weight.

Key:
MeAcr: methyl acrylate; EtAcr: ethyl acrylate; Acetph: acetophenone; C3-Ald: propionaldehyde, BHT: tert-butyl hydroxytoluene, Hydr: hydroquinone monomethyl ether.

Example 1

Evaluation of Components A), B) and C) as Individual Substances

Components A), B) and C) of odorants according to the invention were evaluated as individual substances in concentrations of 25 and 50 mg per kg of hydrogen gas (specification: 99.99 wt. % hydrogen, max. 2 ppm oxygen, max. 3 ppm nitrogen, max. 5 ppm water and max. 1 ppm alkanes and alkenes) in olfactory terms with regard to their warning odour and their warning intensity as compared with non-odorised hydrogen gas (blank value).

The test was performed at room temperature (around 20° C.) by pressure reduction of hydrogen gas odorised with the odorant to be tested from a steel or aluminium flask (200 bar hydrogen pressure) by means of a reducing valve to atmospheric pressure and olfactory evaluation of the emerging odorised hydrogen gas by a group of trained testers (8 to 12 people). The evaluation was made on a scale from 1 (very weak/no warning effect) to 10 (very strong/strong warning effect); the stated values are mean values.

The results were substantially the same for both concentrations that were tested (25 and 50 mg/kg hydrogen). Table 1 compares the results for components A), B) and C) for use according to the invention as individual substances (i.e. not in the form of an odorant according to the invention).

TABLE 1

| Pure substance | Group | Rating |
|---|---|---|
| Acrylic acid ethyl ester | A | 5 |
| Acrylic acid methyl ester | A | 4.5 |
| Acrylic acid n-butyl ester | A | 3.5 |
| Acetophenone | B | 2 |
| Propionaldehyde | C | 3 |
| n-Butyraldehyde | C | 3 |

It can be seen from Table 1 that individually, i.e. when not mixed together, components A), B) and C) do not have an adequate odorising effect.

Example 2

Evaluation of an Odorant According to the Invention (Mixture of Components A and B)

Table 2 shows the ratings for mixtures comprising two compounds of component type A) with acetophenone as component B); the procedure was the same as that described in Example 1. The figures in the columns for components A) and B) correspond to their respective percentages by weight in the mixture.

TABLE 2

| Component A | | Component B | |
|---|---|---|---|
| EtAcr | MeAcr | Acetph | Rating |
| 60.0 | 40.0 | — | 6 |
| 60.0 | 37.5 | 2.5 | 7 |
| 60.0 | 35.0 | 5.0 | 8 |
| 57.5 | 35.0 | 7.5 | 8 |
| 60.0 | 30.0 | 10.0 | 7.5 |

It can be seen from Table 2 that in comparison to Example 1, mixtures comprising two compounds of component type A) with acetophenone as component B display a markedly improved odorising performance.

Example 3

Evaluation of an Odorant According to the Invention (Mixture of Components A, B and C)

Table 3 shows the ratings for mixtures comprising two compounds of component type A) with acetophenone as component B) and C3-Ald=propionaldehyde as component C); the procedure was the same as that described in Example 1. The figures in the columns for components A) to C) correspond to their respective percentages by weight in the mixture.

TABLE 3

| Component A | | Component B | Component C | |
|---|---|---|---|---|
| EtAcr | MeAcr | Acetph | C3-Ald | Rating |
| 60.0 | 37.5 | 1.5 | 1.0 | 8.5 |
| 60.0 | 35.0 | 2.5 | 2.5 | 9 |
| 60.0 | 30.0 | 5.0 | 5.0 | 9.5 |
| 50.0 | 39.0 | 6.0 | 5.0 | 9.5 |
| 55.0 | 31.0 | 7.0 | 7.0 | 9 |
| 58.0 | 29.0 | 10.0 | 3.0 | 8.5 |

Table 3 shows that the use of mixtures comprising components A), B) and C) (i.e. an odorant according to the invention with a content of component C) gives rise to outstanding odorising performances. Substantially the same ratings were obtained using n-butyraldehyde in place of propionaldehyde as component C).

Example 4

Storage Stability Tests

To assess the storage stability, hydrogen gas was added to odorants according to the invention (i) in the absence of a component D) and (ii) in the presence of various antioxidants as component D) and the resulting odorised hydrogen gas was tested for its olfactory properties as described in Example 1 after specified test periods stored at 40° C. The criterion for storage stability was the significant olfactory agreement of the odorised hydrogen gas after being stored with the odorised hydrogen gas which had not been stored.

The amount of odorant added to the hydrogen gas was 40 mg/kg.

Odorants of type LAG 1 consisted of 60% EtAcr less y % antioxidant, 35% MeAcr and 5% acetophenone (components A and B and optionally D).

Odorants of type LAG 2 consisted of 60% EtAcr less y % antioxidant, 30% MeAcr, 5% acetophenone and 5% C3-Ald (components A, B, C and optionally D).

Table 4 shows a comparison of the results.

Classification of storage stability: a=less than 2 months; b=max. 3 months; c=max. 5 months; d=more than 6 months.

TABLE 4

| Antioxidant | y % | Storage stability LAG 1 | Storage stability LAG 2 |
|---|---|---|---|
| No antioxidant | — | d | a |
| BHT | 0.01 | d | c |
| BHT | 0.05 | d | d |
| BHT | 0.10 | d | d |
| BHT | 0.50 | d | c |
| Hydr. | 0.01 | d | c |
| Hydr. | 0.05 | d | d |
| Hydr. | 0.10 | d | d |
| Hydr. | 0.50 | d | c |

In the absence of a component C) (odorant LAG 1) the addition of an antioxidant (component D) was unnecessary, and after a storage period of more than 6 months at 40° C. the warning odour was still extremely perceptible. The addition of an antioxidant was not detrimental, however.

In the presence of a component C) (LAG 2), with a suitable choice and dosage of antioxidant, after a storage period of more than 6 months at 40° C. the warning odour was still extremely perceptible.

The same results were obtained in storage stability tests with odorants LAG 1 and LAG 2 which had not been mixed with hydrogen gas.

The invention claimed is:

1. A nitrogen-free, selenium-free and sulfur-free odorant for hydrogen gas, comprising
   A) one or more acrylic acid $C_1$-$C_6$-alkyl esters;
   B) acetophenone;
   C) optionally one or more compounds from the group of $C_3$-$C_4$-aldehydes;
   D) optionally one or more antioxidants.

2. An odorant according to claim 1, further comprising
   A) two different acrylic acid $C_1$-$C_4$-alkyl esters;
   B) acetophenone;
   C) propionaldehyde and/or n-butyraldehyde;
   D) optionally one or more antioxidants.

3. An odorant according to claim 1, further comprising
   A) acrylic acid methyl ester and acrylic acid ethyl ester;
   B) acetophenone.

4. An odorant according to claim 1, further comprising
   A) acrylic acid methyl ester and acrylic acid ethyl ester;
   B) acetophenone;
   C) propionaldehyde and/or n-butyraldehyde;
   D) one or more antioxidants.

5. An odorant according to claim 1, further comprising:
   i) 80 to 97 wt. % of component A) and/or
   ii) 1 to 15 wt. % of component B) and/or
   iii) 1 to 10 wt. % of component C) and/or
   iv) 0.01 to 0.2 wt. % of component D).

6. An odorant according to claim 1, wherein the ratio by weight of component B) to component C) is in the range from 3:1 to 1:3.

7. A method for the odorisation of hydrogen gas comprising, adding an odorant according to claim 1 to hydrogen gas.

8. An odorised hydrogen gas comprising (i) a hydrogen gas having a hydrogen content of at least 98 wt. % and (ii) an odorant comprising an effective amount of
   A) one or more acrylic acid $C_1$-$C_6$-alkyl esters;
   B) acetophenone;
   C) optionally one or more compounds from the group of $C_3$-$C_4$-aldehydes;
   D) optionally one or more antioxidants.

9. A process for the odorisation of hydrogen gas having a hydrogen content of at least 98 wt. %, comprising adding an effective amount of an odorant to the hydrogen gas wherein the odorant comprises
   A) one or more acrylic acid $C_1$-$C_6$-alkyl esters;
   B) acetophenone;
   C) optionally one or more compounds from the group of $C_3$-$C_4$-aldehydes;
   D) optionally one or more antioxidants.

10. A process according to claim 9, wherein the odorant is added to the hydrogen in a quantity of 5 to 100 mg per kg of hydrogen.

* * * * *